United States Patent [19]

Kaleita et al.

[11] Patent Number: 4,674,115
[45] Date of Patent: Jun. 16, 1987

[54] PROGRAMMABLE TELEPHONE SWITCHER

[75] Inventors: David L. Kaleita, Sterling Heights; James A. Zboralski, Clawson; Darryl A. Hock, Harper Woods, all of Mich.

[73] Assignee: Jabil Circuit Company, Madison Heights, Mich.

[21] Appl. No.: 778,540

[22] Filed: Sep. 20, 1985

[51] Int. Cl.[4] .............................................. H04M 1/72
[52] U.S. Cl. .................................... 379/201; 379/386; 379/387; 379/397
[58] Field of Search .................. 179/84 L, 84 R, 81 R, 179/84 VF, 99 H, 99 E, 99 R, 84 T; 379/165, 166, 201, 211, 212, 386, 372, 387, 397, 210

[56]  References Cited

U.S. PATENT DOCUMENTS

| | | | |
|---|---|---|---|
| 3,965,306 | 6/1976 | Watkins | 179/81 R |
| 3,971,899 | 7/1976 | McIntosh | 179/99 |
| 4,017,692 | 4/1977 | Garcia et al. | 179/81 R |
| 4,065,642 | 12/1977 | McClure | 179/18 B |
| 4,088,846 | 5/1978 | McEowen | 179/99 |
| 4,278,844 | 7/1981 | Jones | 179/84 C X |
| 4,346,264 | 8/1982 | Sharvit | 179/18 DA |
| 4,349,703 | 9/1982 | Chea, Jr. | 179/18 HB |
| 4,350,848 | 9/1982 | Kariya et al. | 179/2 DP |
| 4,376,875 | 3/1983 | Beirne | 179/18 B |
| 4,408,102 | 10/1983 | Lumpkin | 179/99 H |
| 4,429,188 | 1/1984 | Allen | 179/84 C |
| 4,446,334 | 5/1984 | Groff | 179/81 R |
| 4,459,434 | 7/1984 | Benning et al. | 179/81 B |
| 4,481,384 | 11/1984 | Matthews | 179/18 DA |
| 4,482,786 | 11/1984 | Flynn, Jr. | 179/90 BD X |
| 4,485,273 | 11/1984 | Bartelink | 179/81 R |
| 4,488,006 | 12/1984 | Essig et al. | 179/81 R |
| 4,490,583 | 12/1984 | Bednarz et al. | 179/99 R |
| 4,491,693 | 1/1985 | Sano et al. | 179/99 R |
| 4,538,031 | 8/1985 | Benning et al. | 179/81 B |
| 4,582,957 | 4/1986 | Hayes et al. | 179/84 C X |

OTHER PUBLICATIONS

TalkTo 109 System Guide by Trillium Telephone Systems Advanced TeleCom Systems Introduces EasyTel.
Zoom Update, Jan. 1985 by Zoom Telephonics, Inc.
Newsletter Advertisement by Mr. Phone Butler.
Jameco Electronics Spring Flyer #127, Electronic Business Update, Nov. 1, 1984.
Cynex Manufacturing Corp. Advertisement for Phone Forward, The TF-Switcher brochure by Command Communications, Inc. 1986.

Primary Examiner—James L. Dwyer
Attorney, Agent, or Firm—Harness, Dickey & Pierce

[57] ABSTRACT

The programmable telephone screening device routes an incoming call to a selected telephone device, depending on preestablished device priorities and upon access codes dialed by the caller. The device provides call hold, call forwarding and automatic dialing and is capable of testing the telephone utility network to determine DTMF and pulse dialing compatability. The device generates ringer signals for directly energizing the ringer circuits of standard telephone devices.

33 Claims, 14 Drawing Figures

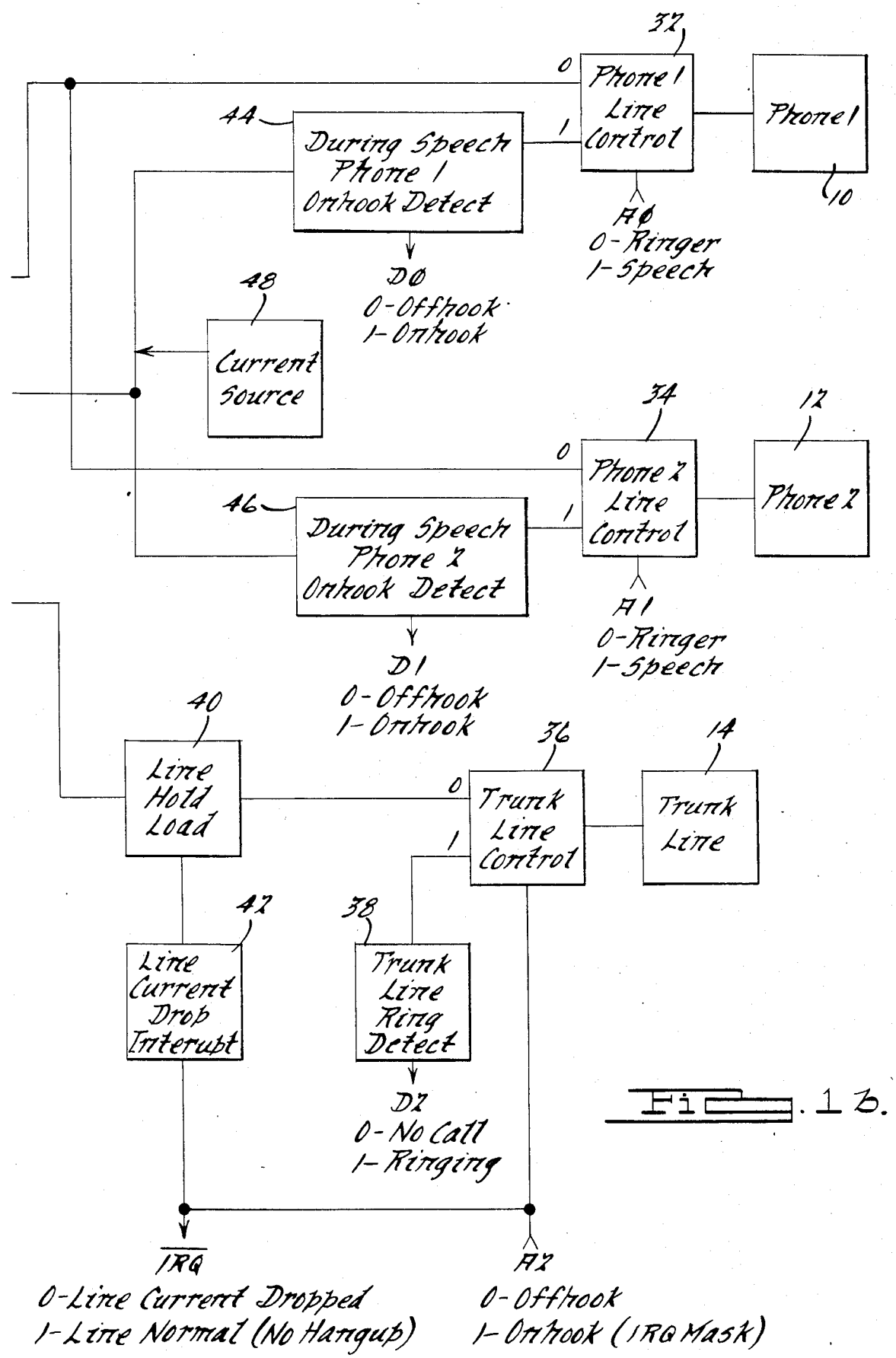

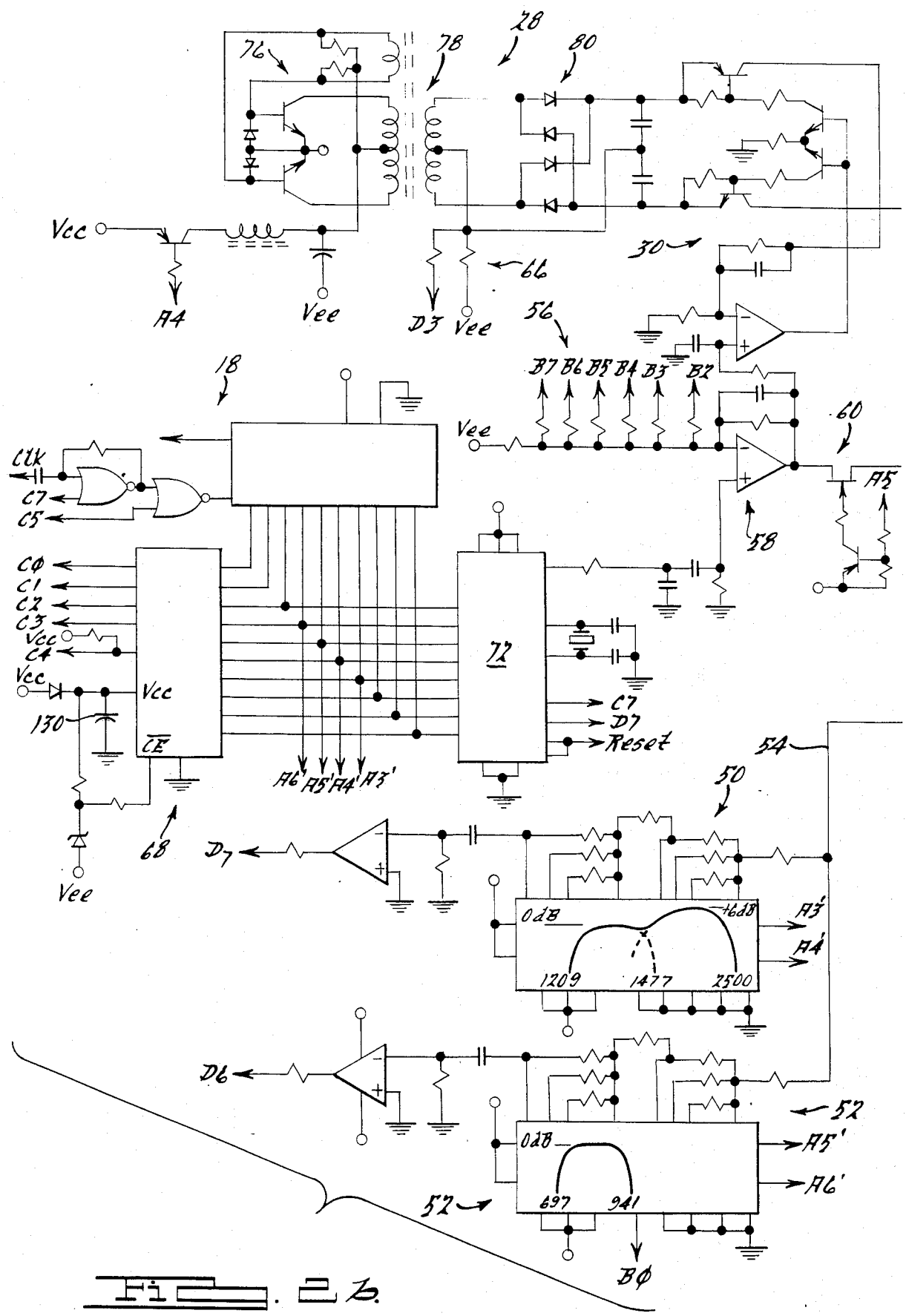

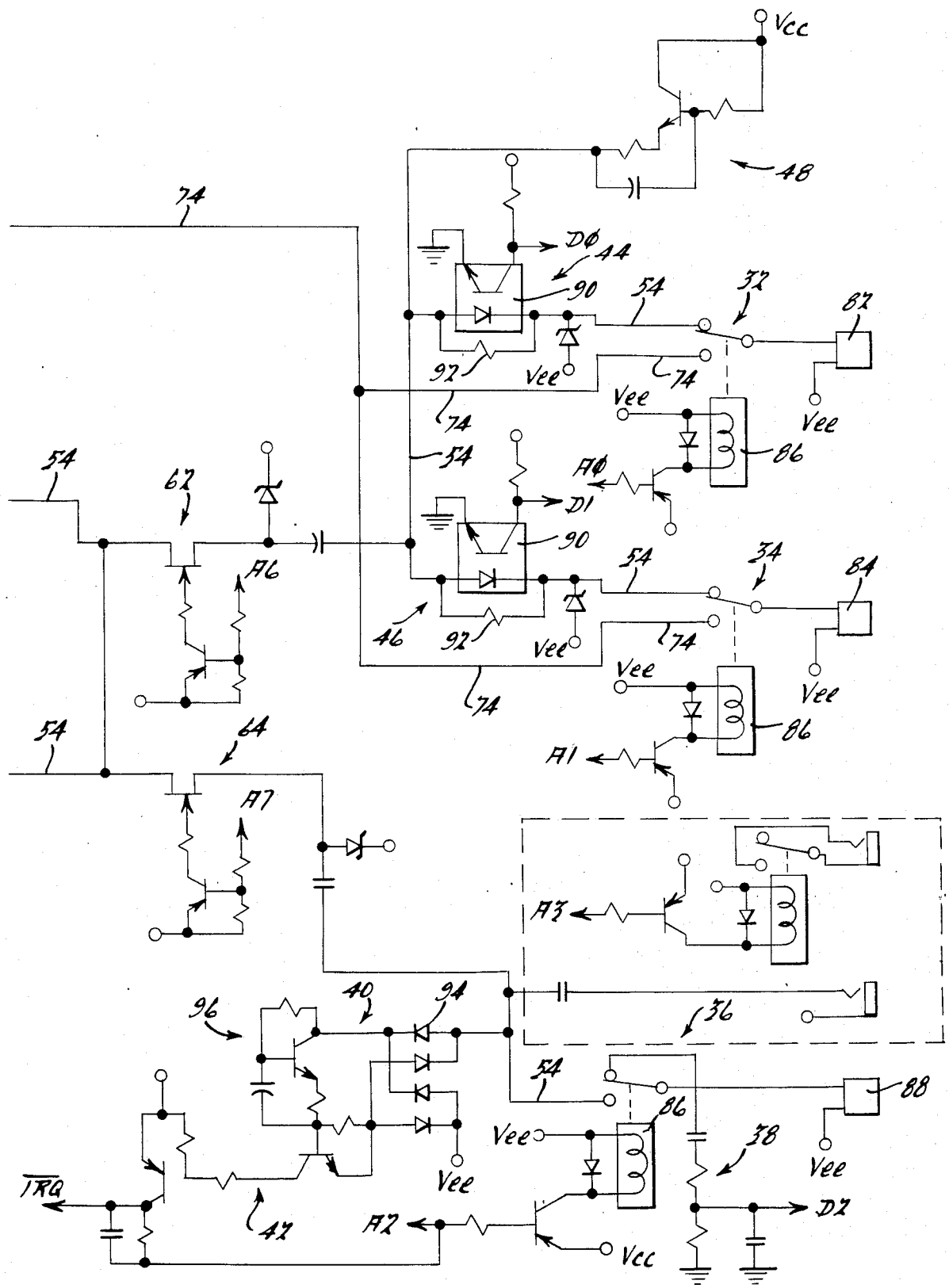

PROGRAMMABLE TELEPHONE SWITCHER

BACKGROUND AND SUMMARY OF THE INVENTION

This invention relates generally to telephone switching equipment for connection to the user side or customer side of the telephone network interface. More particularly, the invention relates to a switching apparatus which may be programmed by the user or incoming caller to route the incoming call from a standard telephone device or outside line to one or more multiple standard telephone devices or other outside lines according to preprogrammed instructions or access codes.

Many households and small businesses have several standard telephone devices connected to a single outside telephone line, for the convenience which multiple telephones can afford. With such an arrangement, an incoming call will normally ring every telephone connected to the outside line, unless one or more of the telephone device ring circuits have been disabled. Once the call is answered, there is no privacy between telephone devices; a party can simply pick up the handset of an unused telephone to monitor or join in another party's telephone conversation. While convenient at times, this lack of privacy can create problems.

In addition to the privacy problem, standard telephone devices are also deficient in screening incoming calls. Add-on call screening devices are available to screen out callers who do not have the correct password or access code, however, these devices have shortcomings. For instance, these devices lack security; once the correct access code has been entered, the incoming call may be taken by or monitored by any one or more of the telephone devices connected to the system as discussed above. Another disadvantage is that unless the caller dials a correct access code, that caller is simply disconnected—nonauthorized callers cannot even leave a message on an answering machine. Also, most prior art call screening devices intercept the telephone ring signal and silence the normal telephone ringer circuit. Such devices are typically not capable of energizing the ringer circuits in one or more standard telephone devices and must, therefore, provide an external electronic ring simulating apparatus. Many persons who are accustomed to answering a ringing telephone find the simulated ringing to be disconcerting, particularly when the ringing emanates from an apparatus located somewhere other than the telephone.

In order to provide greater convenience to the home and small business telephone user, the present invention provides a programmable switching device which selectively channels incoming calls from standard telephone devices or an outside line or lines to one or more other standard telephone devices, including answering machines modems, and the like, or to other outside lines. The device channels the incoming calls according to a predefined priority and/or according to an access code dialed by the calling party. In the latter case the dialed access codes correspond to the actual devices which are desired to be accessed. For greater flexibility, each telephone device may be assigned more than one access code. The unit can also be programmed to allow callers who do not dial a valid access code to be connected to a predefined telephone device, such as an answering machine.

Accordingly, it is an object of the present invention to provide a telephone switching device which incorporates the call screening abilities described above, whereby the calling party can select which telephone device or devices should respond to the call.

Another object of the invention is to provide a screening telephone call diverter which generates a standard ring voltage signal capable of energizing the ringer circuits of standard telephone devices.

It is another object of the invention to provide a programmable telephone switching apparatus which will enable the household or small business telephone user to incorporate a number of other sophisticated features into the telephone system. Such features include an intercom feature, whereby two telephone devices within the system can communicate with one another by simply dialing an appropriate access code. Another such feature is a hold feature, whereby any inside telephone device can put any other inside device or an outside line on hold, while optionally communicating with any other inside device or outside line.

Yet another highly desirable feature is a memory dialer, affording each of the standard telephone devices a separate automatic dialing list.

Yet another object of the invention is to provide an automatic telephone dialing signal protocol converter which automatically tests the outside line and converts a standard telephone device dial signal from pulse to tone or from tone to pulse, according to the comptability of the calling device and the telephone company being accessed.

A further object of the invention is to provide a screening telephone call diverter which automatically connects a first telephone device to the first available outside line, as soon as that device is lifted off hook, while optionally allowing or locking out all other telephone devices which may wish to access that same line, thereby providing a greater degree of privacy.

Yet another object of the invention is to provide a programmable telephone switching apparatus which implements an automatic call forwarding feature, allowing incoming calls to be automatically channeled to an outside line. The apparatus then automatically dials a preprogrammed phone number on that line to thereby forward the incoming call. If desired, the call forwarding apparatus may include a sequential call forwarding feature which will divert the incoming calls sequentially to different telephone devices (or outside lines) according to a preprogrammed, prioritized search list. If the incoming call is not answered by the first forwarding number in the list, successive numbers from the list are tried until the call is completed or until the programmed sequence is exhausted.

Another object is to provide a call screener which can be placed in a learn mode to analyze and digitally record an audio beeper tone like that produced by a remote control device. Such remote control devices are included with some answering machines to allow the owner to retrieve messages by calling home and using the beeper to activate playback. The invention makes it possible to access that remote control feature without having to carry a beeper. The digitally stored beeper tone is produced by the invention upon receiving a predetermined dialed access code.

These and other objects and advantages of the invention will become more apparent from the following detailed description when read in conjunction with the accompanying drawings.

BRIEF DESCRIPTION OF THE DRAWINGS

FIGS. 1A and 1B constitute a hardware block diagram of the invention;

FIGS. 2A, 2B and 2C depict a detailed schematic diagram of the invention;

FIG. 3 is a software block diagram of the invention;

FIGS. 4-6 are flowchart diagrams of the DTMF routines of the invention; and

DESCRIPTION OF THE PREFERRED EMBODIMENT

The present invention is adapted to connect between the user's telephone system and the outside telephone line or lines for the purpose of adding new and previously unavailable features to the user's telephone system. The invention connects to the user side of the network interface and allows the small office or household telephone user to significantly enhance the usefulness of the inside or local telephone system at a cost previously unattainable. For purposes of illustrating the invention, it will be assumed that the user has two telephone devices and one outside line. "Telephone devices" as used herein may include any device adapted for connection to a telephone network interface or an outside telephone line, including both tone and rotary or pulse-dialed telephones, wireless (radio) remote telephones, answering machines, modems, telecopying machines and other data communication equipment, speaker phones, and the like. While the present invention is illustrated using two user-supplied telephone devices and one single outside line, the invention may be implemented to support a greater number of telephone devices and incoming lines.

Figure 1A:
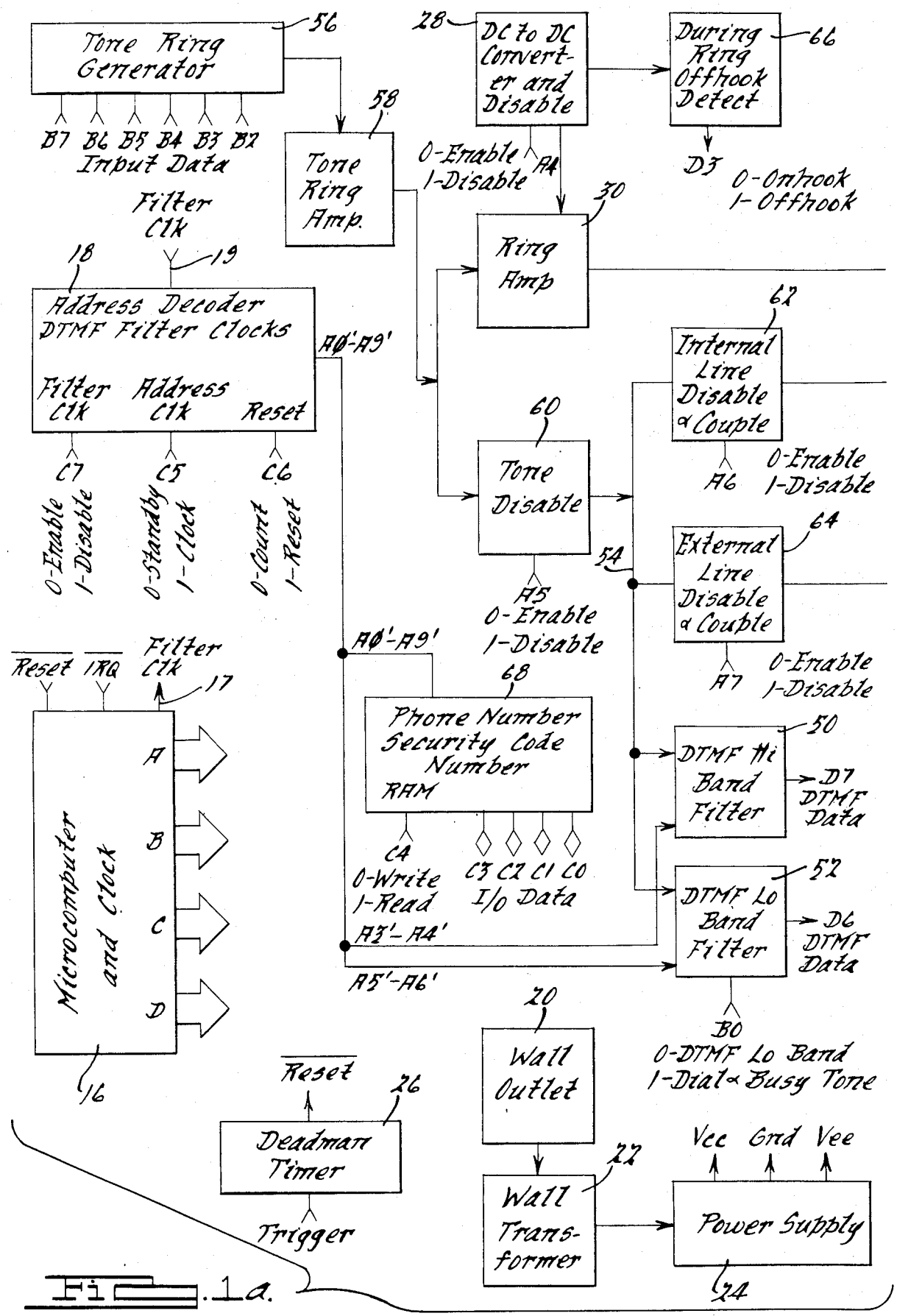
Figure 2A:
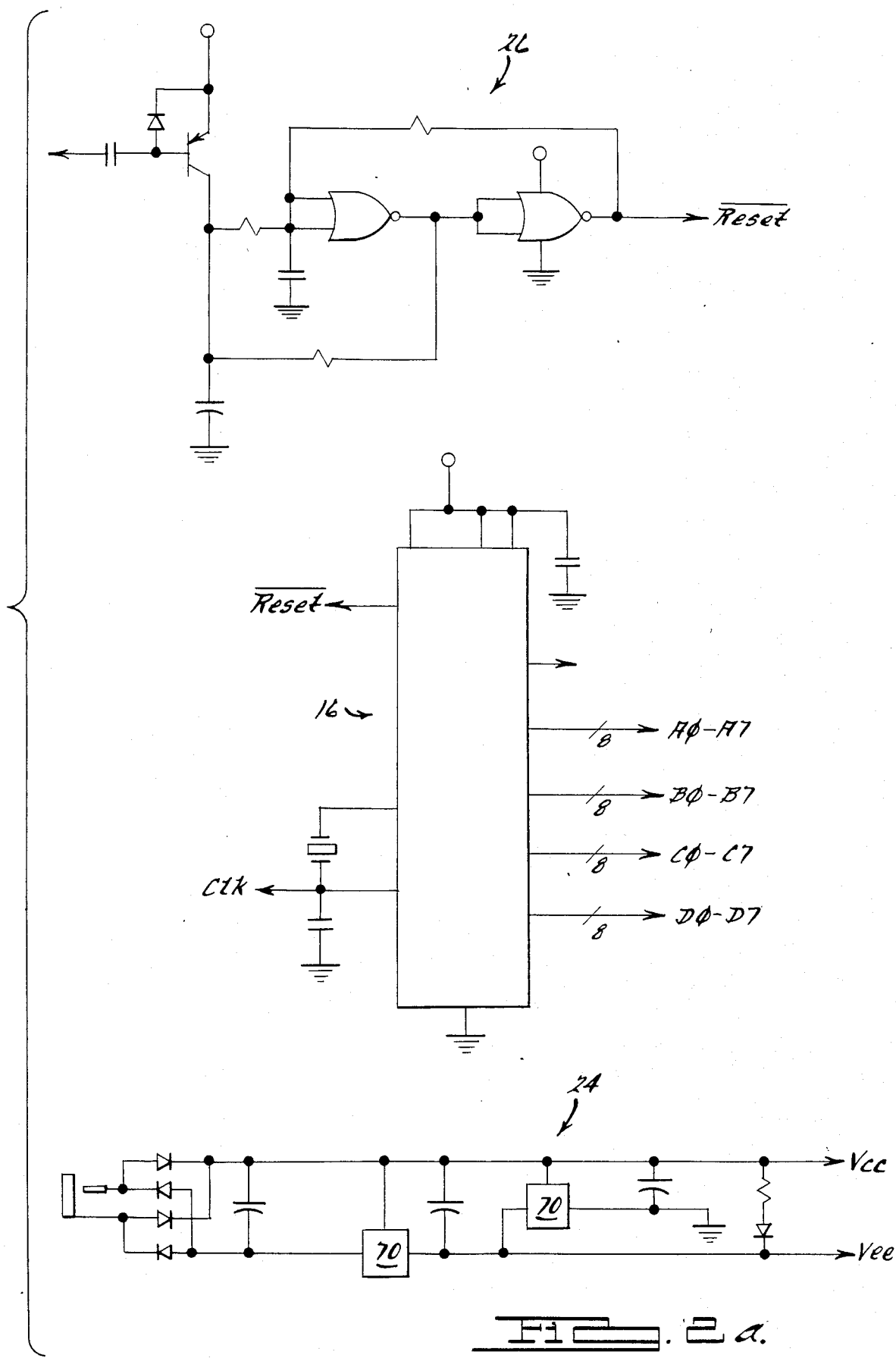

Referring first to FIGS. 1A and 1B, the invention is illustrated in block diagram. The invention is also illustrated in detail in FIGS. 2A, 2B and 2C. To aid in understanding the invention, reference will first be made to the block diagram of FIGS. 1A and 1B. With reference to FIG. 1B, the invention is illustrated in conjunction with a first telephone device 10 (also referred to as phone 1) and telephone device 12 (also referred to as phone 2). The invention is also illustrated in conjunction with an outside line, also referred to as the incoming line or trunk line 14. Telephones 10 and 12 and incoming trunk line 14 connect to and comprise the input/output port of the invention as illustrated. It will be understood that the invention is capable of being implemented using a great number of input/output ports and that the embodiment in FIGS. 1 and 2 are merely representative of the presently preferred embodiment.

At the heart of the invention is microcomputer 16 (shown in FIG. 1A). Microcomputer 16 has four 8-bit buses denoted by the letters A, B, C and D. Microcomputer 16 also includes a reset terminal, an interrupt request terminal IRQ and a system clock terminal which provides a filter clock yet to be discussed. To simplify the schematic block diagram, the connections to the microcomputer input/output ports and other associated terminals have been denoted by alphanumeric labels placed on other components in the system. Thus, for example, the filter clock output terminal 17 (Filter (Clk)) of microcomputer 16 is to be coupled to the filter clock input terminal 19 of address decoder 18. Similar designations are used elsewhere throughout the block diagram.

The presently preferred embodiment is powered by low voltage alternating current derived from a standard AC wall outlet 20 and stepped down through wall-mounted, step down transformer 22, which in turn powers the invention's internal power supply 24. Power supply 24 provides DC voltages Vcc and Vee, as well as providing a system ground bus. The circuit of the invention also includes a "deadman" or "watchdog" timer circuit 26 for protecting against software lock up of the microcomputer 16. Deadman timer circuit 26 is coupled to the reset terminal of microcomputer 16. Deadman timer circuit 26 includes a trigger input terminal which is connected to monitor a periodic pulse train produced by the microcomputer 16. If for some reason the periodic pulse train ceases, as would occur under software lock up, the deadman timer circuit issues a resest pulse to the microcomputer.

Unlike prior art call screening devices, the present invention generates a ring voltage with sufficient energy to directly energize the ringer circuits all of the telephones connected in the circuit, in this case telephones 10 and 12. The ring voltage is generated using a DC to DC converter 28 which in turn drives a ring amplifier 30 to produce a ring voltage of approximately 70 volts RMS (200 volts peak to peak) at approximately 25 Hz. The ring voltage from ring amplifier 30 is coupled to telephone line control circuits 32 and 34. Coupled to the DC to DC converter 28 is an off hook detection circuit 66 for disabling the ring generating circuit under microcomputer control when either telephone 10 or telephone 12 is lifted off hook.

Line control circuits 32 controls telephone 10, while line control circuit 34 controls telephone 12. Essentially line control circuits 32 and 34 switch the respective telephones between a ringer mode and a speech mode or audio mode. When connected in the ringer mode, the associated telephone will not respond to voice signals, hence any telephones placed in the ringer mode cannot monitor a conversation being conducted from another telephone in the system. The line control circuit may, therefore, be energized when privacy is desired.

Coupled to the line control circuits 32 and 34 are detection circuits 44 and 46 for detecting when the respective telephones 10 and 12 are being used during speech or on hook. Detection circuits 44 and 46 are supplied with current by dynamic current source 48 and are coupled to the line control circuits 32 and 34 during the speech mode. The current from current source 48 is delivered to telephones 10 and 12 thereby producing a comparatively low DC impedance while maintaining a high impedance to speech. Detection circuits 44 and 46 are coupled via bus D to microcomputer 16.

In a similar fashion, the incoming trunk line 14 is also coupled to a line control circuit 36, which switches between a ringer mode and a speech mode. In the ringer mode, a trunk line ring detection circuit 38 monitors the trunk line and senses incoming ring signals. When an incoming ring signal is detected, line hold load 40 provides a DC load upon the incoming trunk line 14 so that the telphone utility equipment will recognize an off hook condition. Line hold load 40 employs a dynamic current source to simulate a DC load while presenting a comparatively high impedance to incoming speech signals. Coupled to the line hold load is a line current drop interrupt circuit 42. This circuit senses the brief voltage dropout (commonly 1/10th sec.) which normally occurs during speech path switching in the utility company circuits (such as after a complete number has been dialed, or when the calling party hangs up).

The present invention generates and decodes tone codes (DTMF codes). The decoding of DTMF codes is accomplished by using a high band filter 50 and a low band filter 52. The high band filter passes frequencies in the range of 1209 Hz. through 2500 Hz. The low band filter passes frequencies in the range 697 Hz. through 941 Hz. Filters 50 and 52 are responsive to audible tones on signal routing bus 54 and communicate those tones to microcomputer 16 through bus D.

As will be explained more fully below, the invention may be programmed by the user to perform a wide variety of user selected functions. To provide a convenient and economical means for programming the invention, the user simply enters programming instructions through the touch keypad or rotary pulse dialing circuits found in most standard telephone devices.

In order to generate the frequencies needed to produce DTMF codes and in order to produce the 25 Hz. ring voltage waveform, a tone ring generator circuit 56 is provided. Circuit 56 is coupled to bus B of microcomputer 16 and provides frequencies in the range of 0 to 1600 Hz. The frequencies generated by circuit 56 are amplified in tone ring amplifier 58. The output from tone ring amplifier 58 is coupled to ring amplifier 30 (to provide the 25 Hz waveform from which the ring voltage is generated) and also to a tone disable circuit 60. Tone disable circuit 60 is an analog switching circuit which couples or decouples the DTMF tones to signal routing bus 54.

In general, the invention performs many of its functions by selectively routing various DTMF signals, voice signals, logic signals and ring voltages between the various input/output ports and devices which comprise the circuit of the invention. To assist in routing the voice and DTMF signals, the invention includes an internal line disabling and coupling circuit 62 and an external line disabling coupling circuit 64. Both circuits 62 and 64 are analog switching circuits which are coupled to communicate with signal routing bus 54. Circuit 62 is coupled to line control circuits 32 and 34 via detection circuits 44 and 46, and, thus, communicate with the telephones 10 and 12. Circuit 64 communicates with trunk line control circuit 36 via line hold load 40 and, thus, communicates with the incoming trunk line 14. Both circuits 62 and 64 are switchable between an enabled state and a disabled state under microcomputer control via bus A.

Random access memory 68 is provided for storing user-entered phone numbers and also for storing user-selected security access codes and digitally encoded audio beeper tones yet to be described. Random access memory 68 is coupled to microcomputer 16 through bus C under the control of address decoder circuit 18. In general, address decoder 18 receives filter clock signals and address clock signals from microcomputer 16. The signals are divided down using a counter circuit within the address decoder 18, and the resultant lower frequency signal is used to drive or clock the filters 50 and 52 and also used for memory addressing the random access memory.

With the foregoing hardware block diagram of the invention in mind, reference may now be had to FIGS. 2A, 2B and 2C for a more detailed understanding of the invention in its presently preferred embodiment.

FIGS. 2A, 2B and 2C comprise the complete electronic circuit of the invention. Where applicable, certain portions of the circuit have been designated using the reference numerals of FIGS. 1A and 1B.

With reference to FIG. 2A, microcomputer 16 preferably comprises an NMOS integrated circuit, such as Motorola MC6805U3. Microcomputer 16 provides four eight-bit busses, designated A0-A7, B0-B7, C0-C7 and D0-D7. The A bus is used to communicate with all switches and relays in the circuit and also with the address decoder circuit 18. Address decoder circuit 18 is preferably implemented using a CMOS counter, such as MC14040CP integrated circuit. The B bus of microcomputer 18 is coupled to the digital to analog circuitry of the invention. The C bus controls the random access memory (RAM), such as memory 68, and also provides control over the address decoder circuit 18. Bus D of microcomuter 16 serves as the signal input port. Deadman timer circuit 26 supplies a reset signal to microcomputer 16 if the deadman circuit is not periodically initialized. Power supply 24 employs voltage regulators 70 to provide a Vcc voltage of +5 volts and a Vee voltage of −7 volts.

In order to ensure that the ramdom access memory 68 is protected during times when the power is shut off, a capacitor 130 is placed between the supply voltage lead and ground of the ramdom access memory chip. Capacitor 130 is preferably on the order of 1,000 microfarads, and the random access memory chip is a CMOS chip, such as SCM21C14-4, (see FIG. 2B). The low current drain requirements of the CMOS chip and the comparatively large capacitor allow the retention of data stored in the random access memory for many hours and the need to replace backup batteries is, therefore, eliminated.

Address decoder circuit 18 receives serial data on lines C5 and C7 from microcomputer 16 and also receives the clock signal via the CLK terminal. The address decoder divides the system clock down for providing clock to filters 50 and 52 via leads A3', A4', A5' and A6' from the address decoder 18. Decoder circuit 18 also provides the address signals for addressing random access memory 68. Also, if desired, an optional speech synthesizer chip 72 may be included to aid in programming, to prompt incoming callers for the access code or to implement a telephone answering function. Speech synthesizer chip 72 may be implemented using an SP-0256 integrated circuit coupled to address decoder circuit 18 as shown and provides an output to the tone ring generator amplifier 58. Filters 50 and 52 may be implemented using digital two-pole filter circuits, such as MF10CN integrated circuits. The signals input to filters 50 and 52 on leads A3', A4', A5' and A6' supply the referance clock. In the presently preferred embodiment, the high band filter 50 has breakpoints at 941 Hz. and 2500 Hz. Low band filter 52 has breakpoints at 697 Hz. and 1209 Hz. High band filter 50 preferably has high band emphasis between 1477 Hz. and 2500 Hz. amounting to nominally 6 dB boost above the level of filter 50 in the 1209 Hz. to 1477 Hz. range (and above the peak filter level of the low band filter 52). The preferred filter passband waveshapes are depicted in the respective blocks of filters 50 and 52 in FIG. 2B.

Referring to FIGS. 2B and 2C, the signal routing bus 54 is illustrated. This signal routing bus serves as the primary speech path and tone path for routing the various voice signals and tone signals to their appropriate destinations. Signal flow on routing bus 54 is bidirectional. The ring voltage signal travels on ring signal bus 74. The following will present a further description of the first of the ring signal generating and control circuits and second of the audio (voice and tone) generating and control circuits.

The present invention provides circuitry for activating the ringer circuits of at least four standard telephone devices at the same time. With reference to the DC to DC converter 28 (FIGS. 2B), an oscillator 76 converts the DC energy of power supply 24 into alternating current which is then stepped up through step up transformer 78. The stepped up AC voltage is then rectified by rectifier 80 to provide approximately +/−100 volts DC. This +/−100 volt signal is then applied to ring amplifier 30 which operates in a push-pull fashion. The tone ring generator 56 is coupled to the B bus of microcomputer 16, operating as a digital to analog converter. When it is desired to generate a telephone ring signal, microcomputer 16 provides the digital logic equivalent of a 25 Hz. triangle waveform which the digital to analog converter of tone ring generator 56 applies to tone ring amplifier 58. The output of amplifier 58 is a 25 Hz. sine wave which drives the push-pull amplifier circuit of ring amplifier 30. A 25 Hz., nominally 70-100 volts RMS ring voltage signal is thus developed on ring signal bus 74.

Signal bus 74 splits and supplies the ring signal to line control circuits 32 and 34. The line control circuits are, in turn, coupled to first telephone device port or phone jack 82 and second telephone device port or phone jack 84. The line control circuits each comprise computer controlled relays 86. Line control circuit 32 is responsive to lead A0 and line control circuit 34 is responsive to lead A1. Relays 86 switch under computer control to connect phone jacks 82 and 84 to either the speech and tone signal path of signal routing bus 54 or to the ring signal bus 74. In FIG. 2C, both relays are shown connecting the phone jacks with the speech and tone path of bus 54.

In order to notify microcomputer 16 that a telephone receiver has been lifted off hook when the line control circuits are in the ring mode, the off hook detection circuit 66 is provided. The off hook detection circuit 66 responds to the current drawn by the standard telephone devices connected to the invention. When a standard telephone device is on hook, with the ringer circuit connected, the effective impedance of the telephone device is comparatively high, with the ringer circuit drawing approximately 10 mA. When the handset of the telephone device is lifted, thereby disconnecting the ringer circuit and connecting the voice circuit, the effective impedance drops appreciably. With a 100 volt RMS applied voltage, the standard telephone device might draw on the order of 20 amps, assuming the power supply were able to deliver 20 amps. The ring detection circuit 66 senses the change in current drawn when the handset is lifted and this information is provided via lead D3 to microcomputer 16. A different scheme is provided for sensing when the receiver is off hook during the speech mode. This is discussed below in connection with the audio portion of the invention.

The audio portion of the invention includes the voice routing circuitry, tone generating and decoding circuitry and an optional speech synthesizer, all sharing signal routing bus 54. Disposed at various points along bus 54 are line disabling circuits, such as the tone disable circuit 60, the internal line disable and coupling circuit 62 and the external line disable and coupling circuit 64.

Each of these circuits employs an FET switching transistor, such as an MPF4861 transistor. Each FET is controlled by a bipolar transistor, such as a 2N3906 transistor, which is, in turn, controlled by one of the leads of computer bus A. As indicated, circuits 60, 62 and 64 are controlled by leads A5, A6 and A7, respectively. Tone disabling circuit 60 couples and decouples the tone generation circuitry from bus 54. The internal line disable circuit 62 couples and decouples phone jacks 82 and 84 from the signal routing bus. Similarly, external line disable circuit 64 couples and decouples trunk line jack 88 from bus 54. By selectively switching circuits 60, 62 and 64, the voice and tone signals on bus 54 may be routed between the desired inputs and outputs.

In order to detect when the telephone handset has been lifted off hook during the speech mode (or touch dialing mode) detection circuits 44 and 46 are provided. Detection circuit 44 monitors the telephone device connected to jack 82, while detection circuit 46 monitors the telephone device connected to jack 84. Each circuit comprises an optoisolator 90 with internal light emitting diode connected in the speech path of signal routing bus 54. To protect the light emitting diodes from damage by excessive current, shunt resistors 92 are also provided. A transistorized current source 48 supplies current to power the phones during the speech mode, and this current is sensed by the light emitting diodes of optoisolators 90. Current source 48 preferably delivers at least 60 mA, to each phone and can provide sufficient power to operate at least three standard telephones simultaneously off hook. By increasing the capacity of current source 48 even greater numbers of phones can be supported. When the telephone handset is lifted, with the corresponding line control circuit 32 and 34 in the audio or voice mode, current is drawn from current source 48 through optoisolator 90 to the telephone device. This current energizes the optoisolator which provides an indication thereof on lead D-or D1 to microcomputer 16.

The audio circuitry of the invention is capable of routing both voice signals and also tone signals, such as the tones used in providing tone dialing (DTMF signals). The invention is capable of producing DTMF signals by sending the appropriate digital signals from microcomputer 16 to the tone ring generator circuit 56. Tone ring generator 56 was described above in connection with the production of the 25 Hz. ring signal waveform. DTMF signals are produced in a similar fashion. By storing a predefined set of telephone numbers in random access memory 68, the invention is capable of placing a telephone call using tone or DTMF codes. The codes are routed along bus 54 to the trunk line jack 88, which is, in turn, connected to the outside telephone line. The invention is also capable of being programmed to behave in a variety of different ways using DTMF codes produced by a standard telephone connected to either of jacks 82 and 84. The DTMF codes are again routed on bus 54 to filters 50 and 52, which respond to the DTMF frequency bands and provide digital signals on lines D6 and D7 of microcomputer 16. Microcomputer 16 is programmed in interpret these signals as programming instructions.

In addition to generating and responding to DTMF tones, the invention is also capable of producing and responding to pulse dialing signals. In order to produce pulse dialing signals, line control circuit 36 is switched on and off under computer control to produce the appropriate string of dialing pulses. Pulse dialing signals are detected using detection circuits 44 and 46. Pulse dialing signals produce pulsed current flow through the optoisolator 90, which, in turn, signals microcomputer 16. Thus, a standard rotary dial telephone may be used to provide programming instructions to microcomputer 16.

The trunk line side of the circuit, coupled to trunk line port or jack 88, includes a trunk line control circuit 36 which provides a computer controlled relay 86, controlled via line A2. The line control circuit 36 is switchable between a voice path via signal routing bus 54 and a ringer path to microcomputer 16 via trunk line ring detection circuit 38 and line D2. The trunk line ring detection circuit 38 operates essentially as a voltage divider to place the incoming ring voltage (nominally 100 volts RMS) at computer logic levels. In order to permit the device to place an incoming call on hold, line hold circuit 40 is coupled to signal routing bus 54. The line hold circuit includes rectifier diodes 94 and a transistorized current sink circuit 96. Diodes 94 rectify the incoming voltage so that the invention will operate properly regardless of the tip and ring polarity of the incoming line. Current sink 96 acts as a load to simulate the response of an offhook telephone so that the telephone utility circuits will sense the current flow and retain voice communication connections. Line current drop interrupt circuit 42 monitors the current going into current sink 96 and detects dropouts as a stop in current flow. When a dropout occurs, an interrupt is generated, signaling microcomputer 16 to execute a line current drop interrupt service routine.

FIG. 3 depicts the software block diagram of the invention which is useful in understanding the invention in operation. Essentially, the block diagram comprises a group of interconnected blocks which may be interpreted as computer program routines which control the operation of the inventio. Reset block 98 is the entry point when microcomputer 16 is first powered up. In reset routine 98, a number of housekeeping functions are performed. For example, a spot check of the data stored in random access memory 68 is performed. Cyclic redundancy checking methods (CRC) may be used in this regard. If the RAM data fails the error checking routines, the reset procedure initializes the data space to predefined default conditions. Also during reset, the microcomputer 16 places the circuit off hook and attempts to dial a predetermined number, such as the number 5, using DTMF codes. If the telephone utility circuit responds with a break in dial tone, this indicates that the customer has tone service, and the circuit of the invention is set up to operate with DTMF codes. If a break in dial tone is not received, it is assumed that the customer is connected to a pulse dialed line and the circuit is set up to provide only pulse dialing signals through trunk line jack 88.

After all reset procedures have been performed, control proceeds to the start up wait state 100. Wait state 100 implements a loop in which program control remains until one of the telephones is lifted off hook or until an incoming call is received. When either of these two events occurs, program control jumps to the main control procedure 102. In the main program procedure, microcomputer 16 determines what event caused control to jump from the start up procedure to the main procedure and then calls the appropriate procedure for responding to that event.

For example, if program control entered the main block 102 because of an outside call, control branches to answer block 104. Answer block 104 determines which phone or phones should ring. This will depend upon the manner in which the apparatus has been programmed, either by the user or by the default conditions established in reset block 98. The invention may be programmed to ring all phones connected to the device or it may be programmed to ring selected phones only, or it may be programmed to ring a first phone for a predetermined time interval and then transfer the ring to another phone or phones. Essentially, microcomputer 16 routes the ring signal to the appropriate phone or phones by switching line control circuits 32 and 34 to the ringer mode (in which case the phone rings) or to the speech mode (in which case the phone does not ring).

In addition to preprogrammed ring signal routing, the invention also has the capability of routing the ring signal in accordance with instructions sent by the calling party. The invention has the ability to treat certain telephones as security phones, which cannot be rung by a calling party unless the calling party enters the proper access code. To implement this feature, answer block 104 jumps to the multipurpose ring and beep generator block 106. Block 106 generates the software triangle waveforms which the tone ring generaor 56 converts into the 25 Hz. ring signal. Block 106 also generates the DTMF codes, and is also capable of producing other audio beeps and tones used by the invention to annunciate prompts to the user. When answer block 104 accesses ring and beep generator block 106, a short audible signal or beep is transmitted on the signal routing bus 54 and out to the trunk line jack. The incoming caller will receive the audible signal or beep as a prompt to enter the access code. The entered access code is interrogated in read and compare block 108. This block decodes the dialed access code and checks the code against the list of correct codes stored in random access memory 68. If the access code is found in the memory list, then the corresponding security phone is rung. If the code is not found in the list, then none of the designated security phones will be rung. In the presently preferred embodiment, reset block 98 sets up one phone as a non-security phone. In the event the proper access code is not entered, the non-security phone will ring. Of course, the non-security phone may simply be a commercially available answering machine. Hence, the invention provides effective call screening which protects the user form having to respond to unwanted calls, and yet does respond to all calls incoming.

If main block 102 was entered because the handset of one of the telephones has been lifted off hook, that phone is automatically placed in a condition for placing outside calls. By momentarily depressing and then lifting the switch hook, the phone is placed in the executive mode 110. Depressing the switch hook a second time returns the program to the main block 102. The executive mode is the primary programming mode in which the user can alter the way in which the invention performs. Table 1 below lists the commands available in the executive mode. The first ten commands in Table 1 are designated as the Executive Command Select set. Because there are only ten digits on a standard rotary dial phone, the zero digit is used as a prefix to select a second set of commands designated as the Executive Supplement Command Select set.

TABLE 1
EXECUTIVE COMMAND SELECT

1 = Auto Redial
2 = Auto Dial From Phone Directory
3 = Hold Control (Toggles On/Off)
4 = Privacy Control (Toggles On/Off)
5 = Set Coded Phone Ring Flag
6 = Clear Coded Phone Ring Flag
7 = Set The Number Of Default Rings
8 = Answer Bell's Call Waiting Feature
9 = Intercom Call
0 = Enter Executive's Supplement Menu

EXECUTIVE SUPPLEMENT COMMAND SELECT

1 = Enter Number Into Phone Directory
2 = Enter Access Code Into Directory
3 = Delete Number From Directory
4 = Delete Access Code From Directory
5 = Erase All Access Code Entries
6 = Erase All Directory Entries
7 = Change Pulse dial To tone Dial
8 = Enter First Alternate Long Distance Number And Code
9 = Enter Second Alternate Long Distance Number And Code By selecting command number 1 in the Executive Command Select set, the auto redial feature is activated. Auto redial is implemented by jumping to the auto dial block 112. Block 112 redirects the program controlled to the DTMF and pulse decoder block 114 where a loop is entered waiting for the user to dial the desired number. Once the desired number has been entered, program control returns to the auto dial block 112, whereupon the dialing routine 116 is called. The dialing routine 116 calls upon the ring and beep generating block 106 in order to produce the desired time delays between numbers. The auto dial command number 2 functions in essentially the same way, except that the desired number is retrieved from a lookup table in RAM instead of being entered by the caller.

Command number 3 in the Executive Command Select set places the calling party on hold. The hold routine is implemented in hold block 118 and functions by testing to determine if all phones are on hook. If this condition is satisfied, hold block 118 accesses the ring and beep generator to cause the calling party on hole to hear a short audible signal or beep and to cause all local phones to ring for approximately ½ second every 15 seconds, as a reminder that there is a party on hold. As soon as one of the telephone handsets is picked up, the hold condition is cancelled and control returns to the main program 102.

Command number 4 of the Executive Command Select set is the privacy control command which, when activated, places all unused phones in the ring mode so that voice signals will not be sent to those phones. As discussed above, this is done by selectively switching line control circuits 32 and 34 so that only one phone is capable of receiving voice signals. Commands 5 and 6 of the Executive Command Select set may be accessed by the user to set and clear flags which determine which phone or phones will ring after a predetermined time delay. In the presently preferred embodiment, if an incoming caller selects a particular private phone, and no answer is received within a predetermined number of rings, then control is switched to the nonprivate default phone. Command number 7 of the Executive Command Select set is used to set the number of default rings before this transfer occurs. Command number 8 of the Executive Command Select set is used to answer a standard call waiting signal generated by the telephone utility company. Command number 9 places the telephones in an intercom mode in which the trunk line jack 88 is disconnected from the circuit and voice communication is established between the phone jacks 82 and 84.

The Executive Supplement Command Select set is used primarily to enter or delete telephone numbers and access codes into the random access memory 68. These commands are used to enter frequently called numbers and long distance access codes and area codes into memory for use by the auto dialer. In addition, through these codes, the user can also assign one or more access codes to a given telephone for use by the call screening feature. Since more than one access code can be assigned to one phone, it is possible to have one master access code which will access all telephones, and one or more unique access codes associated only with one telephone. Since these codes are stored in random access memory, they may be changed by the user at any time.

In addition to the commands set forth in Table 1 above, the invention may be programmed to implement other functions as well. For example, the invention may be used to analyze and digitally record an audio beeper tone, like that produced by a remote control device found with some answering machines. Such remote control devices are included with the answering machine to allow the owner to retrieve message by calling home and using the beeper to activate playback. The invention may be configured to reproduce the beeper tone on command, in order to activate the answering machine. The user need no longer carry the remote control beeper, since the audible beeper tone can be reproduced at will in response to a predetermined dialed access code. To implement this feature, the above list of commands is expanded to include a learn mode in place of one of the above functions, for example. when placed in the learn mode, the invention responds to audible tones input via phone 1 or phone 2. The user would simply place the invention in the learn mode and then, holding the remote control beeper to the mouthpiece of phone 1 or phone 2, activate the beeper. The invention responds to the audible tone by analyzing it using the high band filter 50 and the low band filter 52 to determine the frequency components of the audible beeper tone. The frequency data is then stored in random access memory 68. When the user wishes to issue the particular audible beeper tone (in order to activate the playback mechanism of an answering machine, for example) a predefined access code is input via trunk line 14. In most instances, the user is calling from a remote location and would simply dial the predetermined access code in response to a prompt from the invention. Receipt of the predefined access code causes the invention to reconstruct the audible beeper tone using the tone generating circuitry described above. The beeper tone is routed to the appropriate phone device (phone 1 or phone 2), causing the answering machine to respond with a playback of all telephone messages previously recorded.

Figure 4:
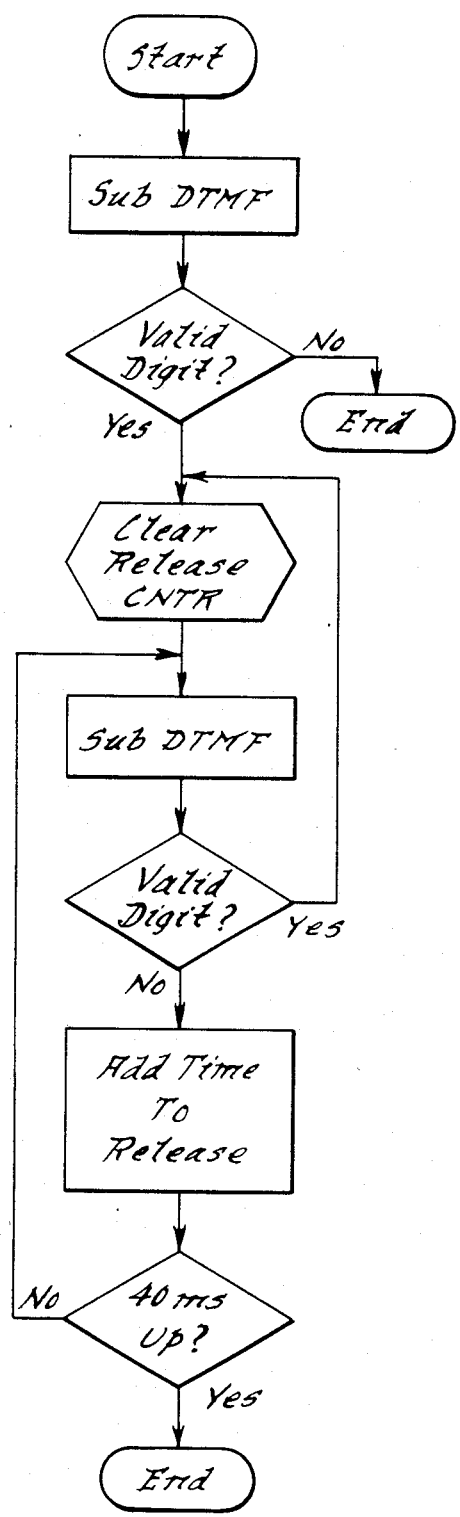
Figure 6:
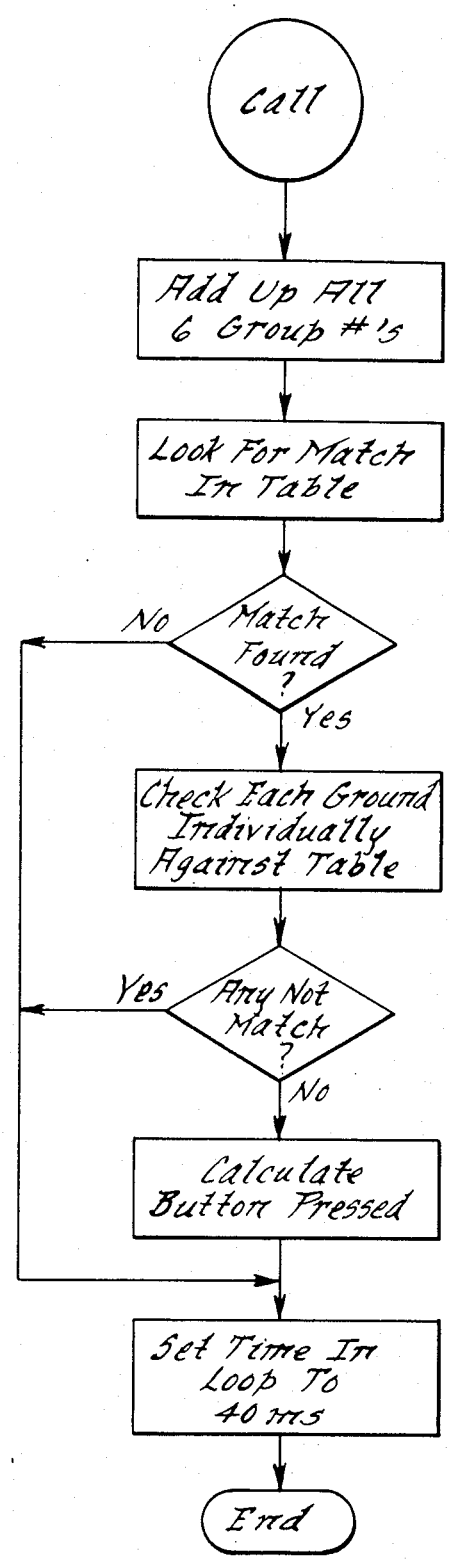

Referring now to FIGS. 4 through 6, the DTMF routines are illustrated. These routines are used to decode DTMF signals and to determine the frequency content of an audio tone. The routines are thus used in converting user-entered access codes and command select codes from an audio format to a digital logic format useable by microcomputer 16. The audio path on bus 54 is fed into the two band splitting filters 50 and 52 which have preset break frequencies as discussed above. The circuitry associated with filters 50 and 52 comprises a pair of zero crossing detectors which provide outputs on leads D7 and D6 to microcomputer 16. Microcomputer 16 responds to the data via leads D7 and D6. In accordance with the routines illustrated in FIGS. 4 through 6.

FIG. 4 depicts a control routine which is used to properly interface the actual DTMF subroutine (shown in FIGS. 5 and 6) with the rest of the software. The routine of FIG. 4 calls the DTMF routine and if a valid digit is returned, continues in the loop. If a valid digit is not returned, control exits. If a valid digit is returned, the routine then continues to call the DTMF routine looking for a valid digit. It continues to loop until a valid digit is not found for 40 milliseconds, at which time it returns to the calling program.

With reference to FIG. 5, the first part of the DTMF routine is of fixed length for timing purposes. This first part accumulates data from the zero crossing detectors over a 33 millisecond time period. This time period is actually six individual 5.5 millisecond time periods. The routine continually loops through this section, accumulating zero crossing data and storing the data in two 6-byte tables. Also during this section, zero crossing interval measurements are made, and the routine exits if either frequency band is out of tolerance. Also, there is a 2 millisecond debounce time preceding this section which makes time period measurements and exits if the times measured are not within predetermined specifications.

Once the data has been accumulated, it is then processed to determine if it was a valid DTMF tone which caused control to proceed through the routine. First, all of the data in each 6-byte table is added up, and then compared to a table containing standard zero crossing data for DTMF tones. If a match is found for both high and low frequency bands, then each individual 5.5 millisecond data byte is compared with another table that contains standard zero crossing data for DTMF tones of that length. If all of those are found to match, the actual button on the telephone device which was depressed is calculated using the location of the data where the match occurred in the table (i.e, the table is in ascending order of tones). If at any time a match is not found, or if a time period error was determined in the first section, the time used up by the routine is calculated and the error is reported. FIG. 5 depicts the first section of the routine while FIG. 6 depicts the second.

Figure 7:
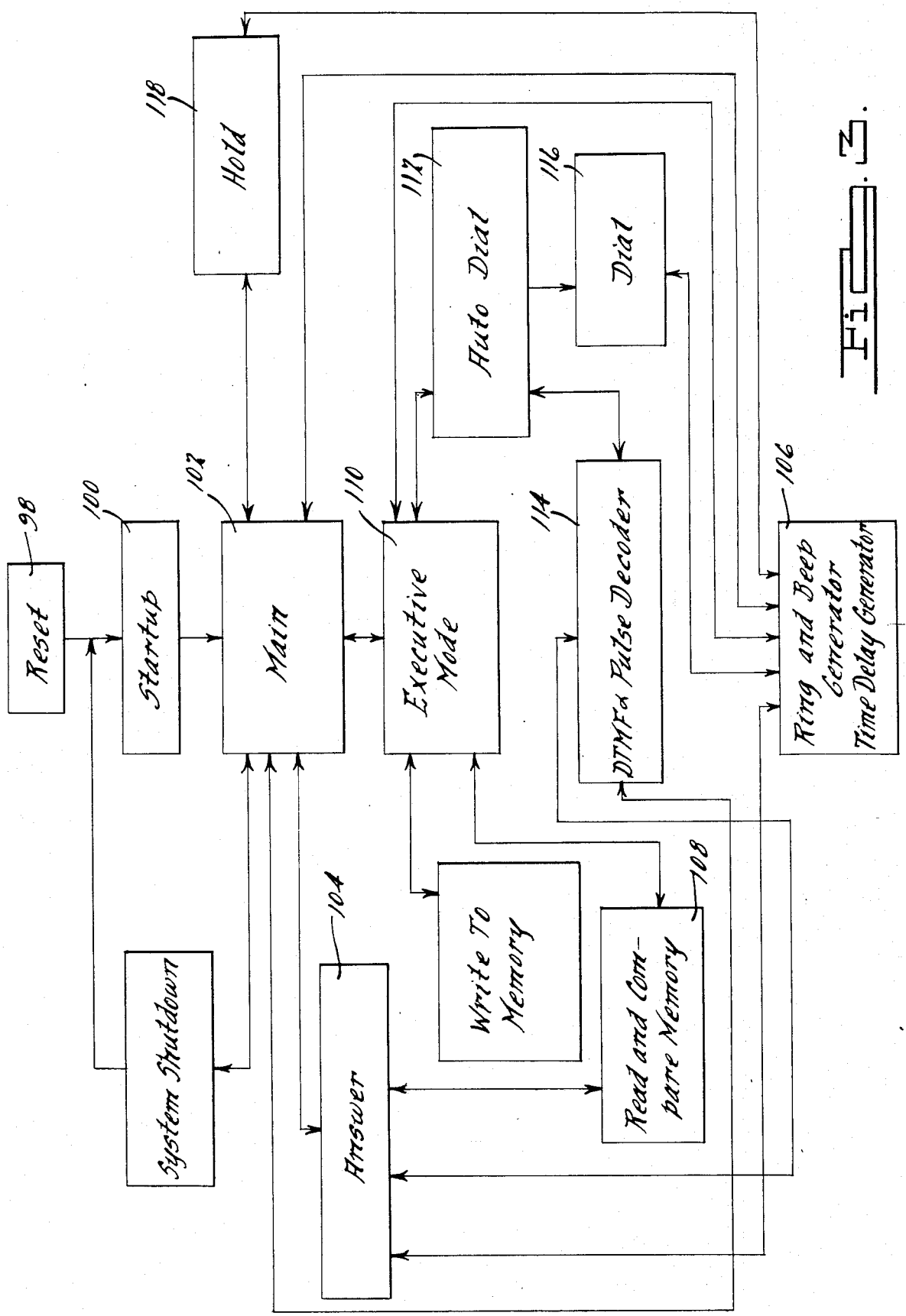
FIGS. 7-11 are flowchart diagrams of the tone generating routines of the invention.
Figure 8:
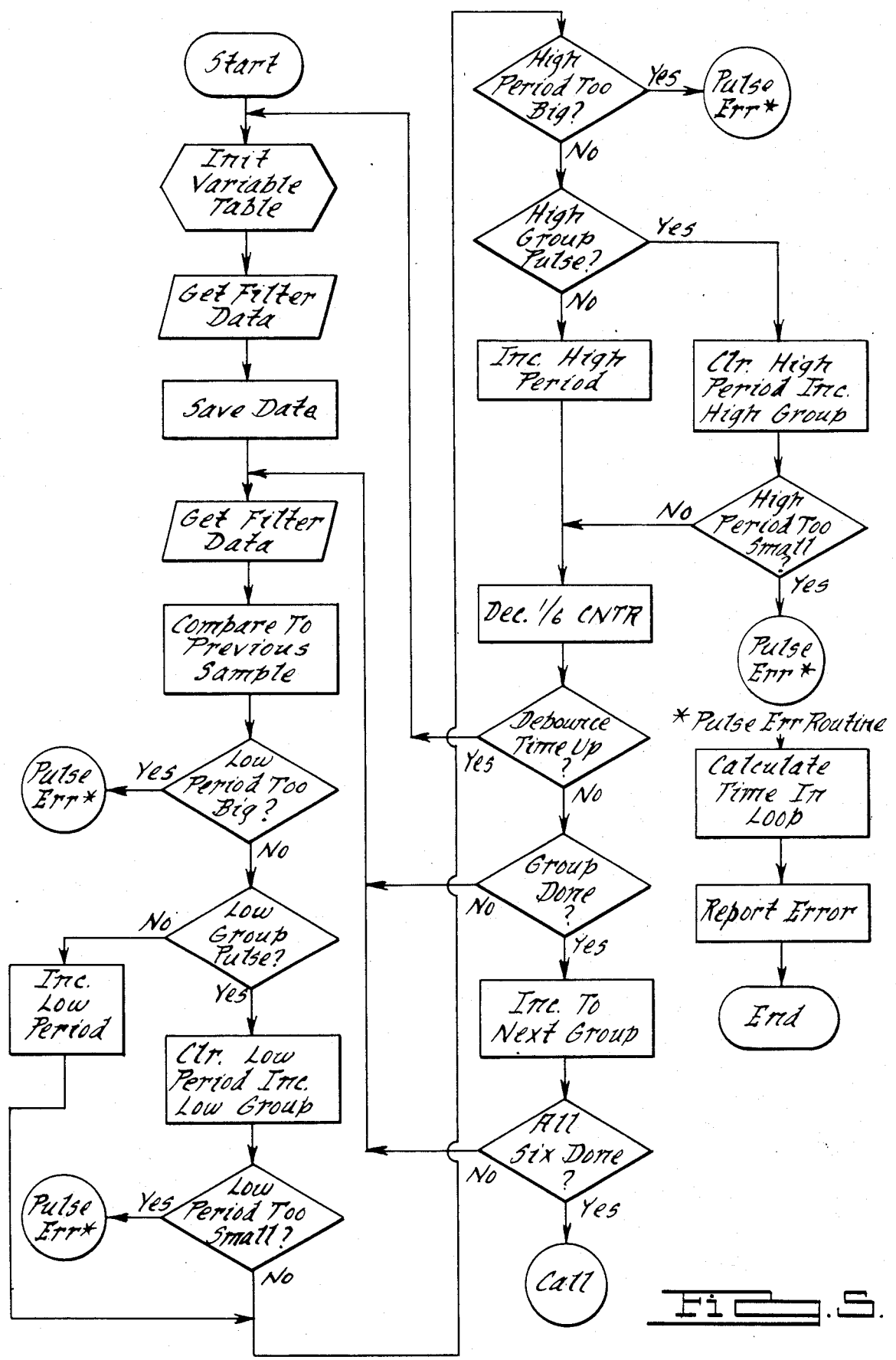
Figure 7:
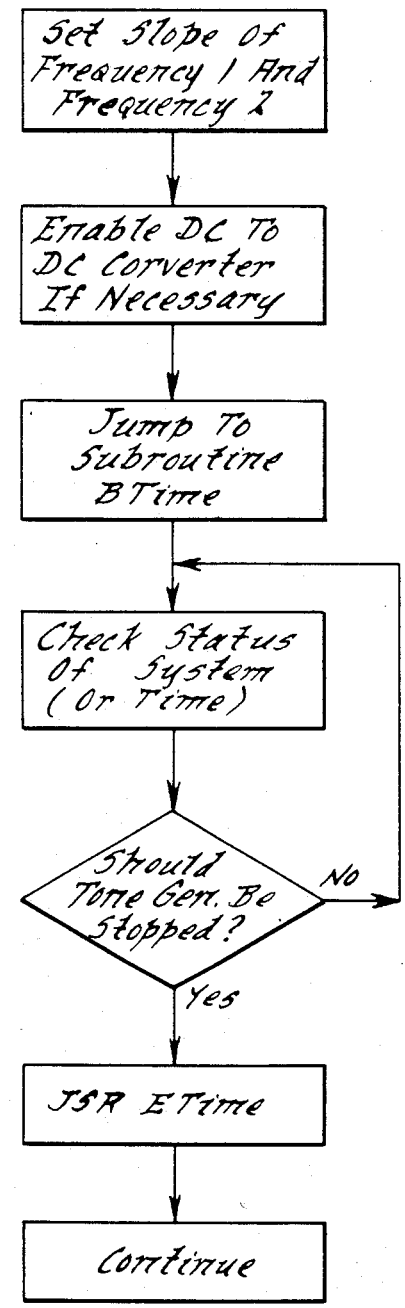
Figure 8:
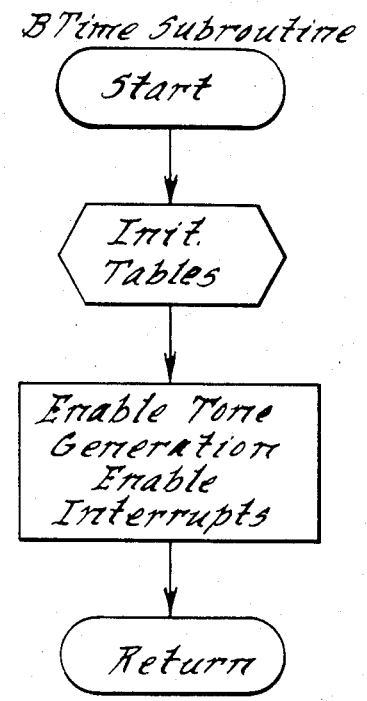
Figure 9:
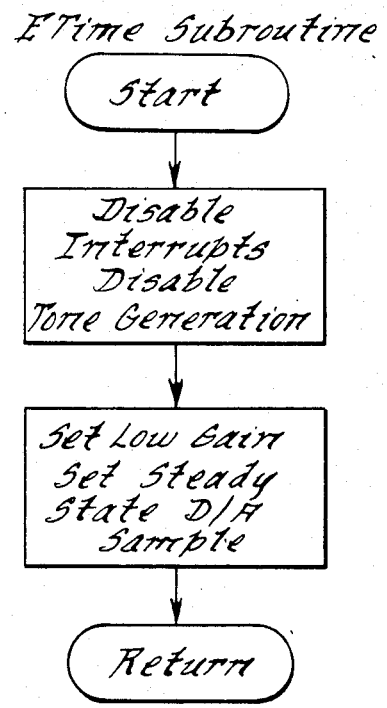

Referring now to FIGS. 7 through 11, the routine for generating tones is illustrated. These routines comprise a first subroutine BTIME used to initialize the variable and switches for the interrupt routine, and also a second subroutine ETIME, which disables interrupts and sets the digital to analog converter to a steady state. Assuming that a two frequency tone is to be generated, e.g. a DTMF tone, the routine must generate two frequencies referred to in the flow chart as frequency 1 and frequency 2. Referring to FIG. 7, the slope of frequency 1 and frequency 2 are first set and then the BTIME subroutine is called. The BTIME subroutine is illustrated in FIG. 8. It operates by accessing initialization tables and then enabling the tone generation circuitry. When the tone has sounded for a sufficient length of time, either a preselected length of time or until the system has changed, the ETIME routine is called to end the tone generation. This routine is illustrated in FIG. 9, and proceeds by disabling interrupts and disabling the tone generation circuitry.

Figure 10:
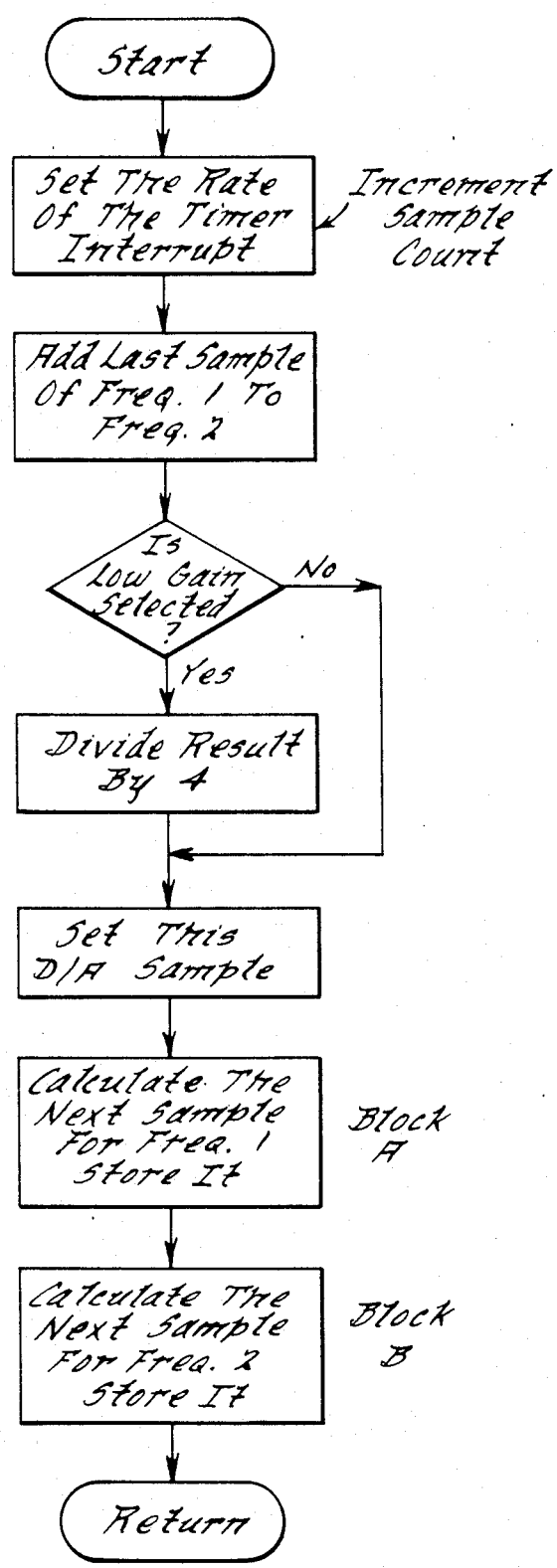
Figure 11:
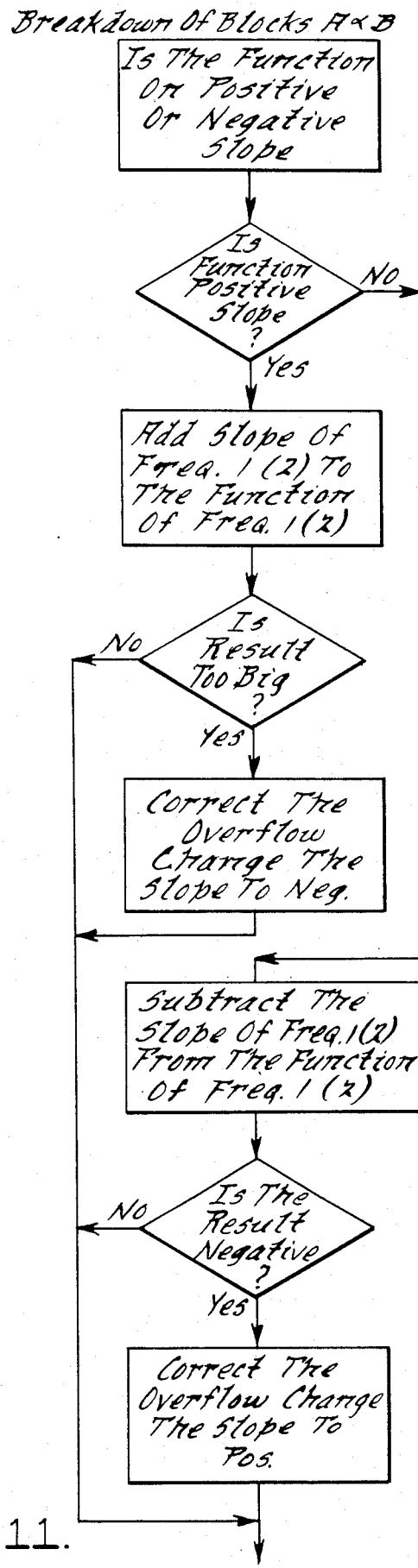

Tones are generated using an interrupt service routine which is called every 176 microseconds. and the tone data is sent out via the 6-bits B2-B7 of the D to A converter of tone ring generator 56. The two frequencies are calculated in software as triangular waves, at the frequencies specified by the slopes. These are added together and sent out via the D to A converter of tone ring generator 56. The output of tone ring generator 56 is a triangular wave which is filtered by hardware into and approximately sinusoidal wave (depending on the frequency of the two tones being generated). The interrupt routine for generating tones is illustrated in FIGS. 10 and 11.

While the invention has been described in its preferred embodiment, it is to be understood that the invention is capable of modification without departing from the true scope and spirit of the invention in its broader aspects.

What is claimed as novel is as follows:

1. A programmable telephone interface apparatus for coupling a plurality of telephone devices to a telephone utility network, comprising:
   programmable switching means, having a plurality of ports, each port being adapted to support bidirectional telephonic communication, including at least one trunk line port adapted for connection to said telephone utility network and at least two device ports each adapted for connection to a telephone device;
   said switching means providing a stored configuration of access codes representing predefined connections between selected ones of said ports; and
   input means responsive to signals entered through a telephone device communicating thorugh one of said ports for changing said stored configuration;
   wherein said switching means is responsive to access code signals originating from said telephone utility network for selectively connecting said trunk line port to a selected one of said device ports.

2. The apparatus of claim 1 further comprising initializing means for establishing an initial configuration of predefined connections.

3. The apparatus of claim 2 wherein said input means alters said initial configuration in response to said signals entered through said telephone device.

4. The apparatus of claim 1 further comprising means for storing said configuration of predefined connections.

5. The apparatus of claim 1 further comprising timing means and wherein said switching means is responsive to said timing means to change said connections between said ports in accordance with said stored configuration.

6. The apparatus of claim 1 wherein said data input means comprises means for decoding DTMF tone signals.

7. The apparatus of claim 1 wherein said data input means comprises means for decoding pulse dialing tone signals.

8. The apparatus of claim 1 further comprising ring voltage generation means responsive to said programming means for producing a ring signal for energizing the ring circuit of a telephone unit.

9. The apparatus of claim 1 wherein said input means is responsive to access codes entered through said one port adapted for connection to said telephone utility network.

10. A telephone call screening apparatus for coupling to a plurality of telephone devices and to a telephone utility network, comprising:
a means for storing a list comprising a plurality of access codes;
a trunk line port for coupling to said telephone utility network;
first and second telephone device ports for coupling to said plurality of telephone devices;
means for receiving an access code through said trunk line port and for comparing said received access code with said list; and
switching means responsive to said access code receiving and comparing means for establishing signal communication between said trunk line port and a selected ones of said device ports in accordance with the results of said comparison.

11. The apparatus of claim 19 further comprising tone generation means for transmitting a signal through at least one of said ports for prompting the entry of said access code.

12. The apparatus of claim 10 wherein said list of access codes includes at least a first access code associated with said first telephone device port and said switching means establishes communication between said first telephone device port and another of said ports when said first access code is entered through one of said ports.

13. The apparatus of claim 12 wherein said list of access codes includes a second access code associated with said first telephone device port.

14. The apparatus of claim 10 further comprising programming means responsive to said ports for changing said access codes in said list.

15. The apparatus of claim 12 wherein said switching means establishes communication between said first telephone device port and said trunk line port when said first access code is entered through one of said ports.

16. The apparatus of claim 15 wherein said one of said ports is said trunk line port.

17. The apparatus of claim 12 wherein said switching means establishes communication between said first telephone device port and said second telephone device port when said first access code is entered through one of said ports.

18. The apparatus of claim 10 further comprising means for generating a telephone ringer signal and for selectively directing said ringer signal to said first and second telepone device ports.

19. The apparatus of claim 18 wherein said generating means comprises:
a DC to DC converter means;
a waveform generating means; and
an amplifier means coupled to said converter means and coupled to said waveform generating means for producing an alternating current ringer signal for directly energizing the ringer circuits of said telephone devices.

20. The apparatus of claim 10 further comprising call holding means for selectively disconnecting said trunk line port and means for simultaneously connecting a load to said trunk line port for maintaining a telephonic connection while placing a calling party on hold.

21. The apparatus of claim 10 further comprising means for generating telephone dialing signals.

22. The apparatus of claim 10 further comprising means for generating DTMF telephone dialing signals.

23. The apparatus of claim 22 wherein said DTMF generating means comprises microprocessor means for providing digital tone signals and ditgital to analog conversion means for converting said digital tone signals to analog signals.

24. The apparatus of claim 10 further comprising means for generating pulsed telephone dialing signals.

25. The apparatus of claim 10 further comprising means for testing the DTMF dialing compatibility of said telephone network and means for selectively generating either DTMF telephone dialing signals or pulsed telephone dialing signals in response to said compatibility testing means.

26. The apparatus of claim 10 further comprising automatic dialing means for generating a predetermined sequence of dialing signals for output through said trunk line port.

27. The apparatus of claim 10 further comprising lockout means for selectively disabling one of said telephone device ports.

28. The apparatus of claim 10 further comprising means coupled to said trunk line port for detecting speech path switching dropout and means responsive to said dropout detection means for switching at least one of said telephone device ports between a voice supporting mode and a ringer supporting mode.

29. The apparatus of claim 10 further comprising DTMF decoding means including a first filter having a bandpass zone from about 697 Hz. to about 941 Hz. and including a second filter having a bandpass zone from about 1209 Hz. to about 2500 Hz., said second filter having substantial signal emphasis above about 1477 Hz.

30. The apparatus of claim 29 wherein said signal emphasis is about 6 dB relative to the passband of said second filter between about 1209 Hz. and about 1477 Hz.

31. The apparatus of claim 10 further comprising means for determining the frequency of a signal input through one of said ports, means for saving data indicative of said frequency so determined, and means for generating a tone signal based on said data in response to a predetermined access code.

32. A telephone call screening apparatus for coupling to a plurality of telephone devices and to a telephone utility network, comprising:
a means for storing a list comprising at least one access code;
a trunk line port for coupling to said telephone utility network;
first and second telephone device ports for coupling to said plurality of telephone devices;
means for receiving an access code through one of said ports and for comparing said receiving access code with said list;
switching means responsive to said access code receiving and comparing means for establishing signal communication between selected ones of said ports in accordance with the results of said comparison; and
means for testing the DTMF dialing compatibility of said telephone netowrk and means for selectively generating either DTMF telephone dialing signals or pulsed telephone dialing signals in response to said compatibility testing means.

33. A telephone call screening apparatus for coupling to a plurality of telephone devices and to a telephone utility network, comprising:
   a means for storing a list comprising at least one access code;
   a trunk line port for coupling to said telephone utility network;
   first and second telephone device ports for coupling to said plurality of telephone devices;
   means for receiving an access code through one of said ports and for comparing said received access code with said list;
   switching means responsive to said access code receiving and comparing means for establishing signal communication between selected ones of said ports in accordance with the results of said comparison; and
   means coupled to said trunk line port for detecting speech path switching dropout and means responsive to said dropout detection means for switching at least one of said telephone device ports between a voice supporting mode and ringer supporting mode.

* * * * *

UNITED STATES PATENT AND TRADEMARK OFFICE
CERTIFICATE OF CORRECTION

PATENT NO. : 4,674,115

DATED : June 16, 1987

INVENTOR(S) : David L. Kaleita et al.

It is certified that error appears in the above-identified patent and that said Letters Patent is hereby corrected as shown below:

Column 1, line 56      "machines" should be
-- machines, --

Column 2, lines 28 and 29      "comptability"
should be -- compatability --

Column 3, line 50      "port" should be -- ports --

Column 3, line 67      "(Clk)" should be
-- Clk) --

Column 6, line 54      "referance" should be
-- reference --

Column 7, line 9      "FIGS." should be -- FIG.--

Column 8, line 36      "32 and 34" should be
-- 32 or 34 --

Column 8, line 39      "D-or" should be
-- DO or --

Column 8, line 62      "in" should be -- to --

Column 9, line 39      "inventio" should be
-- invention --

Column 10, line 27      "generaor" should be
-- generator --

Column 10, line 51      "form" should be
-- from --

UNITED STATES PATENT AND TRADEMARK OFFICE
CERTIFICATE OF CORRECTION

PATENT NO. : 4,674,115

DATED : June 16, 1987

INVENTOR(S) : David L. Kaleita et al.

It is certified that error appears in the above-identified patent and that said Letters Patent is hereby corrected as shown below:

Column 11, line 49            "hole" should be
-- hold --

Column 12, line 34            "message" should be
-- messages --

Column 14, line 39, Claim 1
"and" should be deleted

Column 14, line 41, Claim 1
"thorugh" should be -- through --

Column 14, line 42, Claim 1
after ";" insert -- and --

Column 15, line 24, Claim 11           "19" should be
-- 10 --

Column 16, line 67, Claim 32
"netowrk" should be -- network --

Signed and Sealed this

Twenty-sixth Day of January, 1988

Attest:

DONALD J. QUIGG

Attesting Officer        Commissioner of Patents and Trademarks